United States Patent Office 3,223,082
Patented Dec. 14, 1965

3,223,082
PLASTER OF PARIS PRODUCTS AND THEIR
MANUFACTURE
David F. Smith, 120 Grove St., Bay Head, N.J.
No Drawing. Filed Nov. 20, 1962, Ser. No. 239,059
9 Claims. (Cl. 128—91)

This application is a continuation-in-part of my copending application, Serial No. 686,283, filed September 26, 1957, and now abandoned.

The so-called hard-coated plaster of Paris bandage is used by orthopedic surgeons for making casts to immobilize and support parts of the human and animal body. It comprises a flexible backing material, like gauze, upon which is coated an adherent layer of powdered plaster of Paris. It is usually made by coating gauze with a slurry of plaster in a liquid in contact with which the plaster will not set during processing and in which adhesive or bonding material and plaster set accelerator may be incorporated. The so-coated gauze is then dried by heating to remove the slurry liquid and leave a dry, settable plaster product in which the plaster particles are bonded to themselves and to the gauze so that plaster loss from the bandage is minimized during handling before use and when the bandage is wet in water and the excess water squeezed out at the point of use to make a cast. It is required that a roll of such bandage 4 to 6 inches in width and 5 yards long thoroughly wet when immersed in water for from 5 to 10 seconds and that the plaster set in from 2 to 8 minutes so that there can be nothing present to interfere with rapid wetting and setting of the finished product.

While such slurry liquid may be methyl, ethyl, propyl or isopropyl alcohol or 90–95 percent acetic acid, it desirably should be an aqueous liquid since the coating deposited therefrom is more compact and suitable bonding materials are usually more soluble therein than in a non-aqueous liquid and, of course, the aqueous liquid must contain a material that will delay or inhibit the set of the plaster during processing.

I have discovered new and advantageous such set-inhibitors which comprises aqueous solutions of cellulos glycollic acid ether, hydroxyethyl cellulose glycollic acid ether, cellulose hydroxypropionic acid ether or other cellulose acid ethers than can be obtained in aqueous solution. These materials are to be distinguished from their salts; for example, carboxymethyl cellulose (commonly referred to as CMC) is the sodium salt of cellulose glycollic acid ether and has properties, for my purpose at least, entirely different from those of the free acid.

Cellulose glycollic acid ether, and other cellulose acid ethers, may be made by dialyzing aqueous solutions of their salts or, better, by passing an aqueous solution of the salt through a column of a cation exchanger in the hydrogen form whereby the cation of the salt is replaced by hydrogen ion from the exchanger to yield a solution of the acid ether.

I have found that an aqueous solution of one of the said cellulose acid ethers will delay (retard) the set of plaster of Paris in contact therewith but, when a slurry of plaster in such solution is heated and the water evaporated, a dry, settable, bonded plaster of Paris product is produced whose setting-time is not delayed. I assume that when the slurry is dried, the cellulose acid ether becomes insoluble in water and therefore cannot longer affect the set of the plaster. This insolubilization is presumed to be due to the formation of cross-links or "lactone rings." The salts of cellulose acid ethers do not readily become insolubilized by drying and, in my procedure, would remain soluble in the dried product to delay the set when the finished product is subsequently wet in water preparatory to use. It is thus important for my purpose that there be no appreciable proportion of salts of the cellulose acid ethers remaining in my plaster slurry liquid, that is, if said cellulose acid ethers are made from their salts, there must be essentially complete replacement of the base metal cation by hydrogen.

While dilute solutions of cellulose acid ethers can be made as described hereinbefore and by vacuum evaporation they may be concentrated without insolubilization, however, when dried below about 14 percent by weight of water they become insoluble in water but they are still wettable by water so that they do not interfere with the wetting of my plaster products.

My process, therefore, is to make a slurry of powdered plaster of Paris in a solution of a cellulose acid ether, coat said slurry on a flexible backing material or otherwise form said slurry into a desired shape, and then heat the slurry to evaporate the water, while said solution acts to prevent appreciable setting of the plaster, and yield a dry, settable plaster of Paris product whose setting-time is no longer appreciably delayed. I may include in said slurry plaster set-accelerator like potassium sulfate, zinc sulfate or finely-divided "active" gypsum (the latter made by setting plaster with water and drying and grinding the product and protecting it from exposure to warm, moist air) or mixtures of same in amounts from 0.2 to 3 percent of the weight of plaster. I may also include in such slurry additional bonding material such as cooked starch, dextrin, a dispersion of polyvinyl acetate, etc., in amounts from 0.5 to 3 percent of the weight of plaster.

I use such cellulose acid ethers in aqueous solution of concentration from about 0.5 to 4 percent by weight (corresponding to 0.2 to 2 percent by weight of the plaster of Paris) depending upon the molecular weight of the cellulose acid ether and upon the number of acid groups per anhydroglucose unit of the cellulose which may be from 0.33 to 2.8 (although I prefer from 0.5 to 2 for my use;) and, also, depending upon how much delay of the plaster set is required in the slurry, which may be from a few minutes to several hours depending upon whether the slurry is used continuously as it is made or whether it is used batchwise. If I wish to have a viscous slurry I use a higher molecular weight cellulose acid ether and conversely when I do not wish to have a viscous slurry I use a low molecular weight cellulose acid ether, such materials being available commercially in the form of their sodium salts and designated as of high, medium or low viscosity. They are available commercially under these designations; each designated also as to the number of acid groups per anhydroglucose unit of the cellulose chain. A high viscosity cellulose glycollic acid ether which I would use would be one which in 0.5 weight percent solution dissolved in 0.5 normal aqueous NaOH solution would have a viscosity at 25% C. of about 40 seconds as determined in a modified Ostwald-Fenske viscosimeter pipette ASTM D-445 #300 as compared with 5 seconds for the 0.5 N NaOH alone. A useable low viscosity product by similar procedure would give a viscosity of about 6 seconds.

I may also include in my products a water-soluble softener in an amount from 0.2 to 3 percent by weight of polyethylene or polypropylene glycol of molecular weight between 200 and 2000.

If the drying of the plaster slurry leaves the cellulose acid ether imperfectly insolubilized, a few hours' or a few days' standing in the dry atmosphere of the bandage roll will complete the insolubilization.

I may also include in my aqueous plaster slurry a proportion of methyl, ethyl, propyl or isopropyl alcohol in which case the concentration of the cellulose acid ether may be considerably reduced down to from 0.02 to 0.2 percent by weight depending upon the proportion of alcohol used.

I find also that in place of the free acid cellulose acid ethers described, I may at least partially neutralize them with ammonia. In this case I find it advantageous to use zinc sulfate as plaster set-accelerator which converts such salts to the free acid through combination of the $NH_3$ from their hydrolysis to form the relatively stable complex $Zn(NH_3)_4^{++}$ ion when a proportion of such salts remain in my final product as it is wet in water preparatory to use. In place of $ZnSO_4$ (by which I mean to include also $ZnSO_4.6H_2O$ and $ZnSO_4.7H_2O$) I may also use $CdSO_4$, $CuSO_4$, $CoSO_4$ and $NiSO_4$. These and any of the hereinbefore mentioned plaster set-accelerator may either be included in the plaster slurry or added to the dry, finished product either as such or in suspension in a water-soluble polyethylene or polypropylene glycol.

A specific example of my procedure (cited by way of illustration but not by way of limitation) is as follows. Seventy grams of powdered plaster of Paris was stirred into 17.5 cc. of a 2% aqueous solution of cellulose glycollic acid ether, made from its sodium salt by ion exchange, the salt being of medium viscosity and with a degree of substitution of 1.2 acid groups per anhydroglucose unit. The plaster in this slurry will stand several hours without setting, the cellulose glycollic acid ether acting as a plaster set inhibitor as well as a binder. The slurry so formed was spread on gauze and quickly dried in a stream of air at a temperature up to 250° F. (121° C.). A well bonded bandage was obtained. The drying temperature and time will depend to some extent upon the characteristics of the drier but the slurry is usually heated to at least about 90° C., above which temperature plaster cannot hydrate to form gypsum at atmospheric pressure; however the heating is not continued to the point where anhydrite is formed in considerable amount since the latter is often slower to hydrate in use than is plaster of Paris.

What I claim is:

1. A process for making a dry, settable plaster of Paris product which comprises in succession the steps of: (1) making a slurry of powdered plaster of Paris in a 0.5 to 4 weight percent aqueous solution of a cellulose glycollic acid ether selected from the class consisting of cellulose glycollic acid ethers containing from 0.5 to 2 acid groups per anhydroglucose unit of the cellulose and having a viscosity between about 6 seconds and about 40 seconds as determined in 0.5 weight percent solution in 0.5 normal aqueous NaOH in a modified Ostwald-Fenske viscosimeter pipette ASTM D-445 #300 as compared with 5 seconds for the 0.5 normal NaOH alone; (2) forming the slurry of step (1) into a desired shape while the said solution of a cellulose glycollic acid ether acts to delay the set of the said plaster of Paris; and (3) heating the product of step (2) at a temperature sufficient to remove water therefrom and to substantially insolubilize said cellulose glycollic acid ether, to yield a dry, settable plaster of Paris product whose setting-time is substantially undelayed.

2. The process of claim 1 wherein to the said aqueous solution of step (1) is added from 0.5 to 3% of the weight of said plaster of Paris in said slurry, of an additional bonding agent selected from the class consisting of cooked starch, dextrin and a dispersion of polyvinyl acetate.

3. The process of claim 2 wherein there is further added to the said aqueous solution of step (1), from 0.2 to 3% of the weight of said plaster of Paris in said slurry, of a plaster of Paris set-accelerator selected from the class consisting of potassium sulfate, finely-divided active gypsum and mixtures of same.

4. The process of claim 1 wherein the said cellulose glycollic acid ether of step (1) is at least partially neutralized by $NH_3$.

5. The process of claim 2 wherein the said cellulose glycollic acid ether of step (1) is at least partially neutralized by $NH_3$.

6. The process of claim 3 wherein the said cellulose glycollic acid ether of step (1) is at least partially neutralized by $NH_3$.

7. A dry, settable plaster of Paris bandage of substantially undelayed setting-time, comprising a flexible backing material coated with a substantially uniform combination of 100 parts by weight of powdered plaster of Paris and 0.2 to 2 parts by weight of a cellulose glycollic acid ether selected from the class consisting of cellulose glycollic acid ethers containing from 0.5 to 2 acid groups per anhydroglucose unit of the cellulose and having a viscosity between about 6 seconds and about 40 seconds as determined in 0.5 weight percent solution in 0.5 normal aqueous NaOH in a modified Ostwald-Fenske viscosimeter pipette ASTM D-445 #300 as compared with 5 seconds for the 0.5 normal NaOH alone.

8. The product of claim 7 to which is added from 0.5 to 3 parts by weight of an additional bonding material selected from the class consisting of cooked starch, dextrin and a dispersion of polyvinyl acetate.

9. The product of claim 8 to which is further added from 0.2 to 3 parts by weight of a plaster of Paris set-accelerator selected from the class consisting of potassium sulfate, finely-divided active gypsum and mixtures of same.

References Cited by the Examiner

UNITED STATES PATENTS

| | | | |
|---|---|---|---|
| Re. 23,873 | 9/1954 | Ludwig | 106—93 |
| 2,557,083 | 6/1951 | Eberl | 128—91 |
| 2,725,301 | 11/1955 | Mayer et al. | 106—109 |
| 2,842,120 | 7/1958 | Foelia | 128—91 |
| 2,844,480 | 7/1958 | Greminger | 106—93 |
| 2,874,778 | 2/1959 | Kaveler | 106—93 |
| 2,909,223 | 10/1959 | Kaveler | 106—115 |
| 3,043,298 | 7/1962 | Brickman et al. | 128—91 |
| 3,055,360 | 9/1962 | Turkewitsch | 128—91 |

FOREIGN PATENTS

| | | |
|---|---|---|
| 848,407 | 10/1939 | France. |
| 510,273 | 7/1939 | Great Britain. |
| 901,882 | 7/1962 | Great Britain. |

TOBIAS E. LEVOW, *Primary Examiner.*